United States Patent [19]

Eslinger

[11] Patent Number: 5,065,789
[45] Date of Patent: Nov. 19, 1991

[54] BACK PRESSURE REGULATING VALVE FOR ULTRA HIGH PRESSURES

[75] Inventor: David M. Eslinger, Broken Arrow, Okla.

[73] Assignee: Halliburton Company, Duncan, Okla.

[21] Appl. No.: 581,819

[22] Filed: Sep. 13, 1990

[51] Int. Cl.5 ............................................. F16K 17/02
[52] U.S. Cl. .............................. 137/513.5; 137/514.7; 137/528; 251/122
[58] Field of Search ............. 251/122; 137/514, 514.7, 137/528, 513.5

[56] References Cited

U.S. PATENT DOCUMENTS

| 1,138,278 | 5/1915 | Castle et al. | |
|---|---|---|---|
| 1,222,071 | 4/1917 | Clark | |
| 2,506,162 | 5/1950 | Metzgar | 137/514.7 |
| 3,437,110 | 4/1969 | Birdwell | 137/528 |
| 3,788,352 | 1/1974 | Ane | 137/513.5 |
| 4,022,113 | 5/1977 | Blatt | 137/513.5 X |
| 4,364,411 | 12/1982 | Payton | 137/513.5 |
| 4,620,562 | 11/1986 | Pacht | 137/528 |

FOREIGN PATENT DOCUMENTS 1194074 11/1959 France ........................... 251/122

Primary Examiner—Robert G. Nilson

[57] ABSTRACT

A back pressure regulating valve for ultra high pressures. The valve is designed for use in throttling ultra high pressure pumps, such as those used in fluid jetting systems. The valve has an elongated tapered poppet which fits in an elongated tapered seat such that an elongated, annular tapered flow path is defined therebetween. The flow path preferably has a length greater than a diameter of the poppet, such as approximately ten times the maximum diameter. Also in the preferred embodiment, a minimum annular tapered flow path is defined between the seat and poppet even when the poppet is in an unactuated position. Biasing is provided by a gas filled pressure chamber acting on an actuator piston. The piston at least partially defines a damping chamber, and an orifice is provided between the damping chamber and the pressure chamber so that movement of the piston is damped as it is moved in a direction tending to reduce the volume of the pressure chamber.

19 Claims, 2 Drawing Sheets

BACK PRESSURE REGULATING VALVE FOR ULTRA HIGH PRESSURES

BACKGROUND OF THE INVENTION

1. Field Of The Invention

This invention relates to back pressure regulating valves for use with pumps such as high pressure water jetting pumps, and more particularly, to a valve for ultra high pressure applications utilizing an elongated and tapered poppet and seat to reduce fluid velocity in the valve and having a nitrogen actuator with a damping chamber.

2. Description Of The Prior Art

Hydraulic jetting, wherein fluids such as water, are pumped at high pressures through jetting nozzles, is used for a variety of applications such as industrial cleaning. One industrial cleaning application in which the hydraulic jetting is particularly well adapted is the cleaning of the interiors and exteriors of tubes in heat exchangers and boilers. Water jetting is also used for drilling and cutting of materials.

In many water jetting applications, one or more hand-operated lances or nozzles are used. The operators normally trigger these lances on and off many times during a jetting operation. A flow control device is needed to modulate flow from the pump in the system and maintain a substantially constant system pressure in response to the flow demand which varies with time.

In water jetting applications where the pressure is less than about 20,000 psi, generally referred to as high pressure systems, crankshaft driven, positive displacement plunger pumps are used. Flow control is achieved using a back pressure regulating valve which continuously throttles flow to maintain the desired system pressure in response to the time varying flow demands. However, such back pressure regulating valves are not available for pressures in the range of about 20,000 psi to about 50,000 psi, generally referred to as ultra high pressure applications. Therefore, in ultra high pressure systems, hydraulically driven intensifier pumps have historically been used since the flow from the low pressure, hydraulic power pumps is easily modulated to satisfy the time varying flow demand of the ultra high pressure system. These intensifier pumps typically require more maintenance and offer less flow rangeability than crankshaft driven plunger pumps and therefore are more expensive to operate and are less versatile.

The back pressure regulating valve of the present invention addresses this need by providing a valve which allows the use of crankshaft driven positive displacement pumps such that they operate comparably with intensifier pumps for ultra high pressure applications. One such pump with which the present valve may be used is disclosed in co-pending application Ser. No. 07/559,021.

Prior poppet-type valves are not well adapted to ultra high pressures because very high erosive wear on the valve components is caused by continuously throttling water through such valves at approximately sonic velocity. The valve of the present invention solves this problem by providing a long, tapered annular orifice between the poppet and seat which greatly reduces the flow rate through the valve.

The valve of the present invention includes a compressed gas actuator similar to those in the prior art. However, the valve of the present invention also may have a damping chamber therein which dampens movement of the actuating piston, thereby enhancing valve stability and component life.

SUMMARY OF THE INVENTION

The back pressure regulating valve of the present invention is adapted for ultra high pressure pumping systems and comprises a body means for forming an enclosure or central opening and having an inlet and an outlet therein, a seat positioned in the body central opening and defining an elongated tapered seat surface therein, a poppet having an elongated tapered poppet surface thereon disposed in the seat and adjacent to the seat surface such that an elongated, annular tapered flow path is defined between the inlet and the outlet when the poppet is in an actuated position, and biasing means for biasing the poppet toward the seat. The length of the seat surface is preferably several times greater than any diameter thereof, and the length of the poppet is also preferably several times greater than any diameter thereof, so that the flow path is formed with a length several times greater than a diameter of the poppet or seat surface. In the illustrated embodiment, the lengths of the seat and poppet are approximately ten times the corresponding maximum diameters.

In the preferred embodiment, a minimum annular tapered flow path is defined between the seat and poppet when the poppet is in an unactuated position. That is, it may be said that the poppet surface on the poppet is always spaced at least slightly from the seat surface in the seat so that the poppet is always slightly open. This provides valve stability and reduces the possibility of side or tensile loading on the poppet which could cause it to break. Also, there is preferably an annular gap defined between the seat and the body which reduces the possibility of uneven loading on the seat which could cause the seat to break. The seat is preferably removable from the body.

The valve may further comprise guide means for guiding movement of the poppet and retaining means for retaining the guide means in the body adjacent to the seat. A sealing means may be provided for sealing between the poppet and the guide means. Further, a drain means may be provided for draining fluid which may leak past the sealing means.

The body means preferably comprises a body and an actuator housing attached thereto. The housing forms a portion of the biasing means. The biasing means further comprises a piston engaged with the poppet and disposed in the housing such that a pressure chamber is defined between the piston and the housing, and a pressurized gas disposed in the pressure chamber such that the piston is forced toward the poppet. The gas is preferably an inert gas such as nitrogen.

The piston and housing further may define a damping chamber, and an orifice is disposed in the piston for providing communication between the pressure chamber and the damping chamber. This insure damping of the actuator piston as it is moved in a direction tending to reduce the volume of the pressure chamber.

A means may be provided for limiting biasing of the poppet toward the seat, and this may include means for adjusting a relative position between the actuator piston and the poppet. The means for limiting biasing and for adjusting is characterized in the preferred embodiment by an adjusting screw extending from the piston adjacent to the poppet. Shims may be provided to limit movement of the adjusting screw.

An important object of the present invention is to provide a back pressure regulating valve for use with crankshaft driven pumps operating at ultra high pressures.

Another object of the invention is to provide a back pressure regulating valve having an elongated seat and matching poppet which define an elongated annular flow path therethrough for greatly reducing fluid flow through the valve.

An additional object of the invention is to provide a back pressure regulating valve wherein the valve is always at least partially open.

A further object of the invention is to provide a back pressure regulating valve having a pressurized gas actuator with a damping chamber defined therein.

Additional objects and advantages of the invention will become apparent as the following detailed description of the preferred embodiment is read in conjunction with the drawings which illustrate such preferred embodiment.

DESCRIPTION OF THE PREFERRED EMBODIMENT

Figure 1:
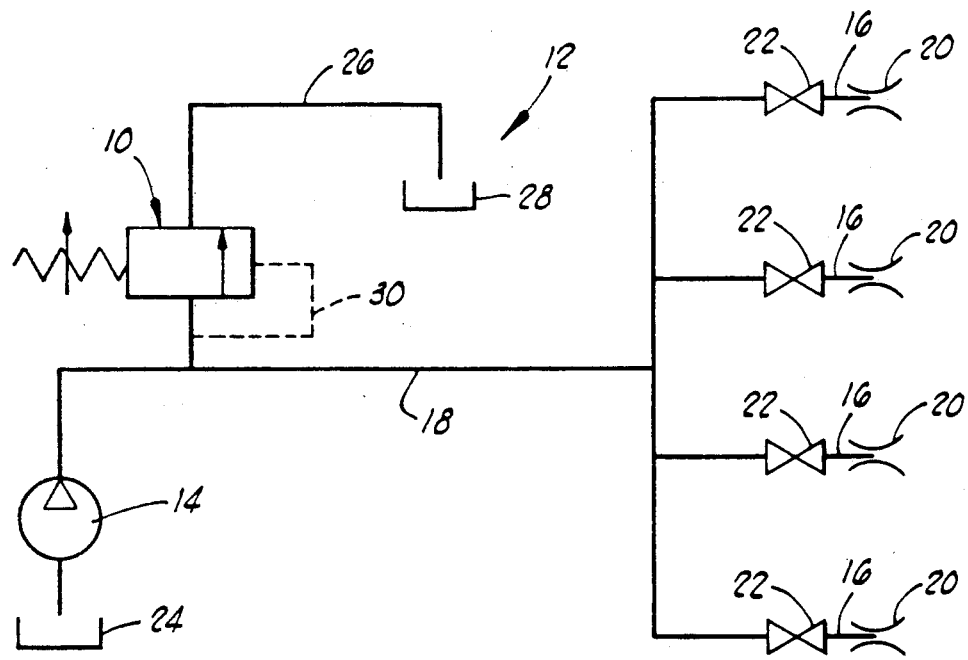
FIG. 1 schematically illustrates the back pressure regulating valve of the present invention in an ultra high pressure jetting system.

Referring now to the drawings, and more particularly to FIG. 1, the back pressure regulating valve for ultra high pressures of the present invention is schematically shown and generally designated by the numeral 10. Valve 10 is part of an ultra high pressure jetting system 12 which also includes a pump 14, such as a crankshaft driven positive displacement plunger pump, and one or more jetting lances 16 which are connected to pump 14 by discharge line 18. Each jetting lance 16 is of a kind known in the art and has a discharge orifice 20 and a shut-off valve 22 for opening and closing fluid flow to the corresponding orifice.

Fluid is fed to pump 14 from an inlet reservoir 24, and valve 10 is connected to discharge line 18. Valve 10 normally discharges through a line 26 into a discharge reservoir 28. Discharge reservoir 28 and inlet reservoir 24 may be the same. In an alternate embodiment, valve 10 may simply bypass back to its inlet through an alternate discharge line 30.

Figure 2:
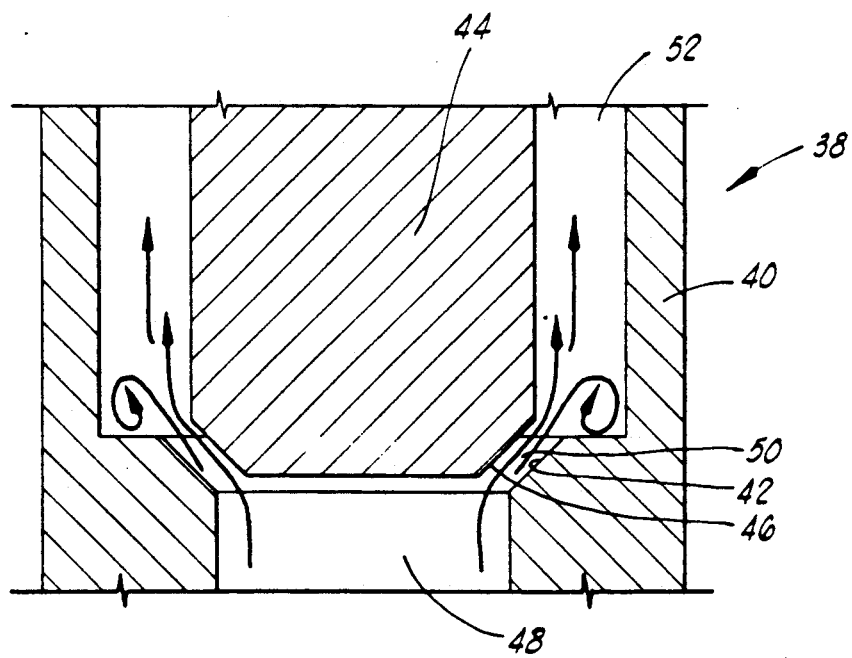
FIG. 2 illustrates a prior art poppet valve.

System 12, as previously noted, is designed for ultra high pressure water jetting, that is, with pressures in the range of about 20,000 psi to about 50,000 psi. However, the schematic of FIG. 1 is also adequate to represent a prior art system for high pressure water jetting, that is, those with pressures less than about 20,000 psi. In such a prior art system, a conventional poppet-type valve is used rather than the valve of the present invention. To more fully understand the significant advantages of valve 10 of the present invention, a description of such a prior art poppet valve, designated by the numeral 38 in FIG. 2, will be presented. Valve 38 includes a body or enclosure 40 having a chamfered seating surface 42 therein. A poppet 44 having a chamfered surface 46 thereon, adapted for engagement with seating surface 42, is biased toward the seating surface by any known biasing means. Upstream from poppet 44 is a high pressure fluid area 48 which acts on the poppet. When the fluid pressure is sufficient to overcome the biasing force, poppet 44 opens such that a fluid flow path 50 is defined between surface 46 on poppet 44 and seating surface 42. Downstream of the poppet is a low pressure fluid area 52.

Flow through flow path 50 is at essentially sonic velocity (for example, 1,600 feet per second at 35,000 psi). The energy in the highly accelerated flow through flow path 50 is essentially converted to heat by turbulent fluid friction between the high velocity jet exiting flow path 50 and the relatively low velocity low pressure fluid area downstream. The flow arrows in FIG. 2 generally indicate the turbulence of the fluid flow immediately after it discharges from flow path 50. The high velocity flow and the downstream turbulent eddies all work to cause severe erosion of all of the valve components. Thus, such a prior art valve 38 is not well adapted for ultra high pressure applications.

Figures 3, 4:
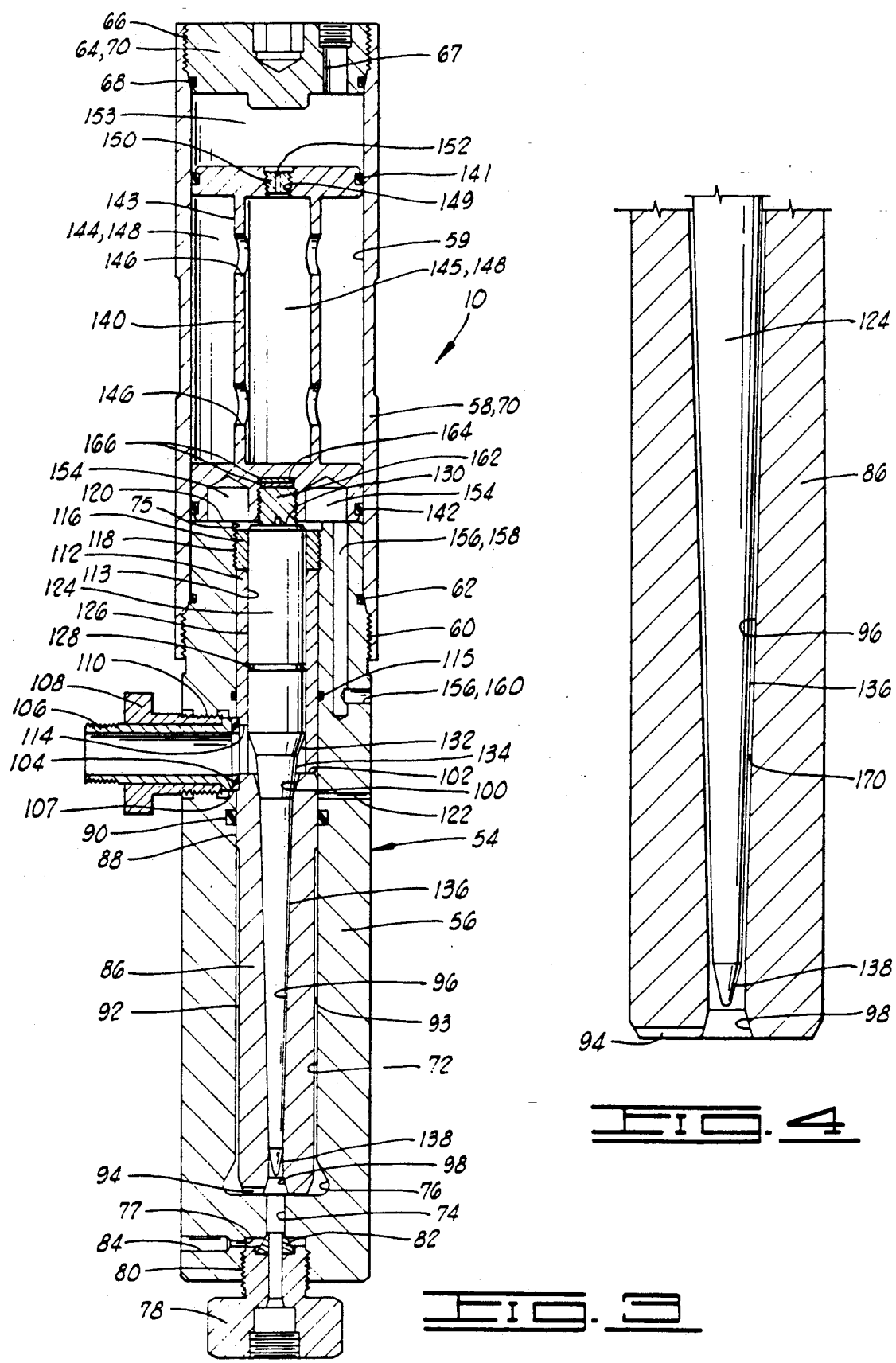
FIG. 3 is a longitudinal cross-sectional view of the back pressure regulating valve of the present invention.
FIG. 4 is a detailed cross-section of the poppet and seat and the annular flow area defined therebetween.

Referring now to FIG. 3, the details of valve 10 of the present invention are shown, and the following description will indicate the improvements of valve 10 over prior art valve 38.

Valve 10 comprises a body means 54 for forming an enclosure for the other components. In the preferred embodiment, body means 54 comprises an elongated body 56 with an actuator tube 58 having a bore 59 therein. Actuator tube 58 is attached to body 56 at threaded connection 60. A sealing means, such as O-ring 62, provides sealing engagement between body 56 and actuator tube 58.

At the opposite end of actuator tube 58 is an actuator cap 64 connected to the tube at threaded connection 66. Actuator cap 64 has a pressure opening 67 therein adapted for connection to a gas pressure source.

A sealing means, such as O-ring 68, provides sealing engagement between actuator cap 64 and actuator tube 58. Actuator tube 58 and actuator cap 64 may be said to form an actuator housing or enclosure 70.

Body 56 defines an elongated first bore 72 and a smaller second bore 74 therein. Body 56 also defines a counterbore 75 above first bore 72. A relief 76 may be provided at the end of first bore 72 nearest to second bore 74.

Below second bore 74 is an inlet opening 7 into body means 54. An ultra high pressure inlet fitting 78 of a kind known in the art is attached to body 56 at threaded connection 80 and is in communication with inlet opening 77. Inlet fitting 78 includes a sealing means 82 for sealing engagement with body 56 adjacent to second bore 74. Body 56 defines a vent or drain opening 84 adjacent to threaded connection 80 for venting or draining any fluid which might leak past sealing means 82.

Disposed in first bore 72 of body 56 is an elongated seat 86 which preferably is replaceable. Seat 86 has a first outside diameter 88 in close relationship to first bore 72, and a sealing means, such as O-ring 90, provides sealing engagement therebetween. Seat 86 has a slightly smaller second outside diameter 92 which, as will be seen by those skilled in the art, provides relief as seat 86 is inserted past O-ring 90 into body 56. Thus, a small annular gap 93 is defined between seat 86 and body 56.

There is a radially extending groove 94 in the bottom of seat 86. Gap 93 and groove 94 insure that the pressure acting on seat 86 is equalized. Seat 86 is preferably made from a hard material, and this pressure equalization reduces the possibility of side loading on seat 86 which might cause it to break. Groove 94 also prevents trapping pressure in gap 83.

Seat 86 defines a very elongated tapered bore 96 therein with a chamfer 98 at the lower end thereof and another chamfer 100 at the upper end thereof.

Adjacent to upper end 102 of seat 86, body 56 defines an outlet opening 104 which has an outlet fitting 106 disposed therein. A sealing means, such as gasket 107, provides sealing engagement between outlet fitting 106 and seat 86.

A retaining nut 108 is engaged with body 56 at threaded connection 110 and holds outlet fitting 106 in place. Outlet fitting 106, gasket 107 and retaining nut 108 are of a kind known in the art.

A poppet guide 112 is disposed in first bore 72 of body 56 and is adapted for engagement with upper end 102 of seat 86. Gasket 107 also seals between outlet fitting 106 and poppet guide 112. Poppet guide 112 defines a bore 113 therethrough and a transverse opening 114 which provides communication between bore 113 and outlet opening 104 in body 56. A sealing means, such as O-ring 115, seals between body 56 and poppet guide 112 to prevent leakage of low pressure fluid therebetween.

A retainer 116 is engaged with body 56 at threaded connection 118. Retainer 116 bears against poppet guide 112, and thus holds the poppet guide and seat 86 in place in body 56. Preferably, retainer 116 is recessed below upper end 120 and counterbore 75 of body 56.

A vent or drain 122 is defined in body 56 between O-ring 90 and upper end 102 of seat 86 to vent any leakage past O-ring 90.

An elongated poppet 124 is disposed in poppet guide 112 and seat 86. Poppet 124 has an upper guide portion with an outside diameter 126 in close, sliding relationship with bore 113 in poppet guide 112. A sealing means, such as piston seal 128, provides sealing engagement between poppet 124 and poppet guide 112.

An upper end 130 of poppet 124 extends out of retainer 116 into counterbore 75 in body 56. Below outside diameter 126 on poppet 124 are first and second tapers 132 and 134. It will be seen that at least a portion of second taper 134 extends into chamfer 100 in seat 86.

Below second taper 134, poppet 124 has a very elongated third taper 136. Third taper 136 extends into tapered bore 96 in seat 86. Third taper 136 and tapered bore 96 taper at substantially the same angle, preferably in the range of about one to three degrees from the central axis of valve 10. In other words, third taper 136 and tapered bore 96 are matching tapers. Below third taper 136, poppet 124 has a relatively short fourth taper 138 which forms a point on the end of the poppet.

It will be seen that first and second tapers 132 and 13 thus connect the guide portion of poppet 124 formed by outside diameter 126 with third taper 136. First and second tapers 134 preferably tend to minimize stress concentrations in poppet 124, and provide gradual expansion of fluid exiting third taper 136. The exact number of tapers or the configuration of the portion of poppet 126 interconnecting outside diameter 126 and third taper 136 is not intended to be limited to the exact embodiment illustrated in FIG. 3.

An actuator piston 140 is disposed in actuator housing 70 above upper end 120 of body 56. Piston 140 is adapted to reciprocate in bore 59 of actuator tube 58. A sealing means, such as upper piston seal 141 and lower piston seal 142, provide sealing engagement between piston 140 and bore 59.

Piston 140 has a reduced outside diameter 143 such that an annular volume 144 is defined between piston 140 and bore 59 in actuator tube 58. Piston 140 also defines an internal cavity 145 therein. A plurality of transverse ports 146 provide communication between annular volume 144 and cavity 145. Annular volume 144 and cavity 145 may be said to form a damping chamber 148.

At the upper end of piston 140 is a threaded opening 149, and an orifice plug 150, defining an orifice 152 therethrough, is threadingly engaged with opening 149.

A pressure chamber 153 is defined in actuator housing 70 between piston 140 and actuator cap 64. It will be seen that orifice 152 provides limited communication between pressure chamber 153 and damping chamber 148.

At the lower end of piston 140 is at least one recess 154 which is in communication with counterbore 75 in body 56. Body 56 defines a vent or drain 156 formed by a substantially longitudinal hole 158 and a substantially transverse hole 160. Vent 156 is in communication with recesses 154, and it will be seen that a vent or drain means thus is provided for any leakage past seal 128 on poppet 124 or O-ring 115 between body 56 and poppet guide 112.

An adjusting screw 162 is threaded into a hole 164 in the bottom of piston 140. Adjusting screw 162 is preferably a socket head set screw and is adapted for engagement with upper end 130 of poppet 124. One or more shims 166 may be positioned in hole 164 to vary the amount that adjusting screw 162 extends below the bottom of piston 140. In this way, the maximum upward position of poppet 124 with respect to piston 140 may be adjusted.

OPERATION OF THE INVENTION

In the initial assembly of back pressure regulating valve 10, adjusting screw 162 in piston 140 is adjusted to obtain the desired relationship of poppet 124 with seat 86 when piston 140 is in the bottommost position as shown in FIG. 3 wherein the piston contacts upper end 120 of body 56. In making this adjustment, poppet 124 is first positioned so that third taper 136 thereof is in contact with tapered bore 96 in seat 86. Adjusting screw 162 is set such that it just contacts upper end 130 of poppet 124 when piston 140 is in contact with upper end 120 of body 56. Adjusting screw 162 is then threaded inwardly with respect to piston 140 so that it is backed off from upper end 130 of poppet 124. That is, there will be a slight gap between adjusting screw 162 and poppet 124. In one preferred embodiment, adjusting screw 162 is backed off enough to create a gap of approximately 0.04 inches between adjusting screw 162 and poppet 124, but the invention is not intended to be limited to this particular initial adjustment.

In this initial position, when poppet 124 is subjected to fluid pressure, it will be pushed upwardly so that it contacts adjusting screw 162. At this point, an annular gap 170 is formed between third taper 136 of poppet 124 and tapered bore 96 in seat 86, as seen in the enlarged detail in FIG. 4.

It will thus be seen that inlet opening 77 and outlet opening 104 in body 56 are always in communication. It may be said that gap 170 forms an elongated, annular tapered flow path 170 between poppet 124 and seat 86. Flow path 170 has a length several times greater than any diameter along tapered surface 136 or tapered bore 96, and, in the illustrated embodiment, this length is approximately ten times the maximum diameter.

In this initial position, the thickness of gap 170 is selected to be quite small by setting adjusting screw 162 so that flow therethrough is minimal. In the preferred embodiment, gap 170 is sized such that only approximately one gallon per minute will pass therethrough at a differential pressure between inlet opening 77 and outlet opening 104 of about 35,000 psi.

If poppet 124 sealed on seat 86, then the pressure necessary to open the poppet would be acting across the smallest diameter of the poppet. Once poppet 124 opened under these circumstances, the pressure necessary to operate valve 10 would be significantly lower than the pressure necessary to open it. This would occur because the projected area, as viewed from the bottom of poppet 124, of third taper 136 is not small compared to the area of any full diameter along third taper 136. This difference in the pressure to operate valve 10 and the pressure to open it would result in an inherent instability which could cause the valve to chatter and function improperly. Gap 170 insures that the fluid pressure is always acting along the full length of poppet 124 in gap 170, thereby providing valve stability. Prior art valves with relatively short tapers do not have this problem, and therefore do not need the feature of gap 170.

Poppet 124 is preferably selected from a hard material, and because of its long thin configuration, is susceptible to breakage when subjected to side or tensile loading. Gap 170, albeit very small in the initial position, has the additional advantage of eliminating all such side and tensile loading on poppet 124, thereby preventing the possibility of breakage.

In operation, a gas, preferably an inert gas such as nitrogen, is supplied to pressure chamber 153 through pressure opening 67 in actuator cap 64. It will be seen that this pressure is also communicated to damping chamber 148 through orifice 152.

Inlet fitting 78 is connected to pump discharge line 18 in system 12 and is thus subjected to discharge pressure from pump 14. During a jetting operation, one or more of lances 16 are opened, allowing fluid flow therethrough. Obviously, the number of lances opened determines the pressure in discharge line 18. When the discharge pressure in line 18 is increased by the closing of one or more of shut-off valves 22 on lances 16, this increased pump discharge pressure is applied to inlet opening 77 of back pressure regulating valve 10.

The gas pressure in pressure chamber 153 provides a downward force on piston 140 and thus on poppet 124. When the pump discharge pressure acting on the bottom of poppet 124 increases the force sufficiently to overcome the pressure acting on piston 140, poppet 124 will be moved upwardly, thereby increasing the size of gap 170 and allowing fluid from pump discharge line 18 to be bypassed through back pressure regulating valve 10.

This fluid enters body 56 through inlet opening 77 and passes through gap 170. The annular flow path defined by gap 170 is still relatively small even when poppet 124 is moved upwardly. Because of this and the fact that the length of the flow path is substantially greater than it diameter, the fluid pressure head is gradually dissipated by viscous shearing of the fluid between third taper 136 on poppet 124 and tapered bore 96 in seat 86. The velocity through annular flow path 170 may be as little as one-fourth that through the seating area of the conventional regulating valve 38 shown in FIG. 2. It is known that erosive wear by pure water is proportional to the velocity of the fluid raised to the power of about five or six. Therefore, the wear rate of valve 10 of the present invention will be approximately 1,000 to 4,000 times slower than on conventional valve 38 at the same operating pressure.

The angle of third taper 136 on poppet 124 and tapered bore 96 in seat 86 controls the gain of the valve. The gain is defined as the flow versus the poppet lift characteristic. A low gain contributes to a wider flow rate operating range and to increased valve stability, a high gain contributes to increased valve responsiveness. As previously noted, the taper angle preferably is in the range of about one to three degrees.

As poppet 124 is forced upwardly by the fluid flow, it will be seen that piston 140 is also forced upwardly. As this occurs, the pressure in pressure chamber 153 is increased because the size of the chamber is reduced. Orifice 152 allows a small flow of gas from pressure chamber 153 to damping chamber 148 during this upward movement. In this way, damping of the upward movement of piston 140 is achieved.

When the increased discharge pressure applied to back pressure regulating valve 10 is reduced, the gas pressure in pressure chamber 146 forces piston 140 downwardly and moving poppet 124 back to its initial position. Orifice 152 insures that the pressures in pressure chamber 153 and damping chamber 148 are again equalized.

The interaction of poppet 124 with seat 86 also provides damping. Since the initial gap 170 between poppet 124 and seat 86 is so small, the long tapered surfaces provide squeeze film damping of the poppet as it moves back toward its initial position. That is, the liquid between poppet 124 and seat 86 cushions the poppet as it moves toward the seat. This damping reduces valve chatter commonly observed in conventional regulating valves at low flow rates. The fact that there is preferably always a gap 170 assists in the preventing of chatter and therefore further reduces the possibility of uneven loading on poppet 124.

It will be seen, therefore, that the back pressure regulating valve of the present invention is well adapted to carry out the ends and advantages mentioned as well as those inherent therein. While a presently preferred embodiment of the valve has been shown for the purposes of this disclosure, numerous changes in the arrangement and construction of parts may be made by those skilled in the art. All such changes are encompassed within the scope and spirit of appended claims.

What is claimed is:

1. A back pressure regulating valve comprising:
   a body defining a body central opening with an inlet and an outlet therein;
   a seat in said body central opening and defining an elongated tapered seat surface therein;
   a poppet having an elongated tapered poppet surface thereon disposed in said seat and adjacent to said seat surface such that an elongated, annular tapered flow path is defined between said inlet and outlet when said poppet is in an actuated position, said flow path having a length greater than a maximum diameter of said poppet, and wherein a minimum annular tapered flow path is defined between said seat and poppet when said poppet is in an unactuated position;

biasing means for biasing said poppet toward said seat; and means limiting movement of said poppet toward said seat by said biasing means.

2. The valve of claim 1 wherein an outer portion of said seat and body define an elongated annular gap therebetween.

3. The valve of claim 1 further comprising guide means for guiding movement of said poppet.

4. The valve of claim 3 further comprising sealing means for sealing between said poppet and said guide means.

5. The valve of claim 1 wherein said biasing means comprises:
a housing;
a piston engaged with said poppet and disposed in said housing such that a pressure chamber is defined between said piston and housing; and
a pressurized gas disposed in said pressure chamber such that said piston is forced toward said poppet.

6. A back pressure regulating valve comprising:
body means for forming an enclosure and defining an inlet and an outlet therein;
a seat in said body means between said inlet and said outlet;
a poppet disposed in said body means adjacent to said seat;
a piston disposed in said body means such that:
a pressure chamber is defined therebetween;
said piston engages said poppet; and
said piston at least partially defines a dampening chamber;
an orifice providing communication between said pressure chamber and said damping chamber; and
a pressurized gas in said pressure chamber such that a force is exerted on said piston for biasing said poppet toward said seat.

7. The valve of claim 6 wherein said damping chamber is formed by an annular chamber defined around said piston and a cavity defined within said piston.

8. The valve of claim 6 wherein said body means comprises:
a body;
an actuator tube connected to said body, said piston being slidably disposed in said actuator tube; and
an actuator cap attached to an end of said actuator tube opposite said body.

9. The valve of claim 6 further comprising drain means between said piston and said poppet for draining fluid which may leak past the poppet.

10. The valve of claim 6 wherein:
said seat defines an elongated tapered seat surface therein; and
said poppet defines an elongated tapered poppet surface thereon adjacent to said seat surface such that an elongated annular tapered flow path is defined therebetween, said flow path having a length greater than a diameter of said poppet.

11. The valve of claim 10 wherein said poppet surface is spaced from said seat surface even when said poppet is in an unactuated position.

12. The valve of claim 10 wherein said seat surface and said poppet surface are tapered at an angle in the range of about one to three degrees from an axis of the valve.

13. A back pressure regulating valve comprising:
a body defining an inlet and an outlet;
a seat disposed in said body between said inlet and outlet, said seat defining an elongated tapered seat surface therein;
a poppet having an elongated tapered poppet surface thereon positioned adjacent to said seat surface such that an elongated annular tapered flow path is defined therebetween when said poppet is in an actuated position, said flow path having a length substantially greater than a diameter of said poppet;
an actuator housing attached to said body;
an actuator piston disposed in said body such that a pressure chamber is defined between said actuator piston and said actuator housing;
means for adjusting a relative position between said actuator piston and said poppet; and
a pressurized gas in said pressure chamber for applying a biasing force on said piston, thereby biasing said poppet toward said seat.

14. The valve of claim 13 wherein said poppet surface and said seat surface are spaced from one another when said poppet is in an unactuated position.

15. The valve of claim 13 wherein a damping chamber is defined by said actuator housing and said actuator piston; and further comprising
an orifice providing communication between said pressure chamber and said damping chamber such that damping of said actuator piston is provided as said actuator piston is moved in a direction tending to reduce a volume of said pressure chamber.

16. The valve of claim 13 wherein said means for adjusting is characterized by an adjusting screw extending from an end of said piston adjacent to said poppet.

17. A back pressure regulating valve comprising:
a body defining a central opening with an inlet and an outlet therein;
a seat in said body central opening and defining an elongated tapered seat surface therein;
a poppet having an elongated tapered poppet surface thereon disposed in said seat and adjacent to said seat surface such that an elongated, annular tapered flow path is defined between said inlet and outlet when said poppet is in an actuated position, said flow path having a length approximately ten times greater than a maximum diameter of said poppet; and
biasing means for biasing said poppet toward said seat.

18. A back pressure regulating valve comprising:
a body defining a central opening with an inlet and an outlet therein;
a seat in said body central opening and defining an elongated tapered seat surface therein, said seat surface being tapered at an angel in the range of about one to three degrees from an axis of the valve;
a poppet having an elongated tapered poppet surface thereon disposed in said seat, said poppet surface being tapered at an angle in the range of about one to three degrees from an axis of the valve and adjacent to said seat surface such that an elongated annular tapered flow path is defined between said inlet and outlet when said poppet is in an actuated position, said flow path having a length greater than a diameter of said poppet; and
biasing means for biasing said poppet toward said seat.

19. A back pressure regulating valve comprising:

a body defining a central opening with an inlet and an outlet therein;

a seat in said body central opening and defining an elongated tapered seat surface therein wherein said body and an outer portion of said seat define an elongated annular gap therebetween extending most of the length of said seat and being greater than a diameter of said seat for substantially equalizing pressure on said seat;

a poppet having an elongated tapered poppet surface thereon in said seat and adjacent to said seat surface such that an elongated, annular tapered flow path is defined between said inlet and outlet when said poppet is in an actuated position, said flow path having a length greater than a maximum diameter of said poppet; and biasing means for biasing said poppet toward said seat.

* * * * *